(12) United States Patent
Kang et al.

(10) Patent No.: US 11,442,633 B2
(45) Date of Patent: Sep. 13, 2022

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Jianbin Kang, Beijing (CN); Jibing Dong, Beijing (CN); Shaoqin Gong, Beijing (CN); Jian Gao, Beijing (CN); Baote Zhuo, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/876,734

(22) Filed: May 18, 2020

(65) Prior Publication Data
US 2021/0132821 A1    May 6, 2021

(30) Foreign Application Priority Data
Oct. 30, 2019  (CN) .......................... 201911046774.7

(51) Int. Cl.
*G06F 12/00* (2006.01)
*G06F 3/06* (2006.01)
*G06F 11/20* (2006.01)

(52) U.S. Cl.
CPC ............ *G06F 3/0619* (2013.01); *G06F 3/065* (2013.01); *G06F 3/0689* (2013.01); *G06F 11/2094* (2013.01)

(58) Field of Classification Search
CPC .... G06F 3/0619; G06F 11/2094; G06F 3/065; G06F 3/0689; G06F 3/0617; G06F 3/0647; G06F 3/0604; G06F 3/062
See application file for complete search history.

(56) References Cited

U.S. PATENT DOCUMENTS

| | | |
|---|---|---|
| 6,513,102 B2 | 1/2003 | Garrett et al. |
| 7,031,966 B2 | 4/2006 | Kedem et al. |
| 9,804,957 B1 | 10/2017 | Chopra et al. |
| 10,146,454 B1 | 12/2018 | Koli et al. |
| 10,152,254 B1 | 12/2018 | Kang et al. |
| 10,852,997 B1 | 12/2020 | Shvaiger et al. |
| 2016/0092119 A1* | 3/2016 | Butterworth .......... G06F 16/119 711/165 |

\* cited by examiner

*Primary Examiner* — Jason W Blust
(74) *Attorney, Agent, or Firm* — BainwoodHuang

(57) ABSTRACT

Techniques involve: determining a source disk slice from a plurality of disk slices of a plurality of storage arrays providing redundant storage, target data on the source disk slice needing to be removed; determining a destination disk slice for storing the target data needing to be removed from the source disk slice, a destination disk where the destination disk slice is located being different from a source disk where the source disk slice is located; and moving the target data from the source disk slice to the destination disk slice. Accordingly, such techniques can improve efficiency of a storage system.

15 Claims, 6 Drawing Sheets

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN201911046774.7 on file at the China National Intellectual Property Administration (CNIPA), having a filing date of Oct. 30, 2019, and having "METHOD, ELECTRONIC DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the field of storage, and more specifically, to a method, electronic device and computer program product for storage management.

BACKGROUND

Nowadays, the storage system is designed to be simple and economical and has a high performance. Such storage system can support storage media of the next generation, has an architecture scalable in longitudinal and lateral directions, has a flexible consumption model, and is very simple in nature. However, increasingly higher requirements are imposed on the storage system with the rapid development of information technologies. Therefore, a solution that can further improve the performance of the storage system is required.

SUMMARY

Embodiments of the present disclosure provide an improved solution for storage management.

In a first aspect of the present disclosure, a method is provided for storage management. The method includes: determining a source disk slice from a plurality of disk slices of a plurality of storage arrays providing redundant storage, target data on the source disk slice being to be removed; determining a destination disk slice for storing the target data to be removed from the source disk slice, a destination disk where the destination disk slice is located being different from a source disk where the source disk slice is located; and moving the target data from the source disk slice to the destination disk slice.

In a second aspect of the present disclosure, an electronic device is provided. The device includes at least one processing unit and at least one memory. The at least one memory is coupled to the at least one processing unit and stores instructions executed by the at least one processing unit. The instructions, when executed by the at least one processing unit, cause the device to perform acts including: determining a source disk slice from a plurality of disk slices of a plurality of storage arrays providing redundant storage, target data on the source disk slice being to be removed; determining a destination disk slice for storing the target data to be removed from the source disk slice, a destination disk where the destination disk slice is located being different from a source disk where the source disk slice is located; and moving the target data from the source disk slice to the destination disk slice.

In a third aspect of the present disclosure, a computer program product is provided. The computer program product is tangibly stored on a non-transitory computer-readable medium and including machine-executable instructions that, when executed, cause a machine to perform any steps of the method described in the first aspect of the present application.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the example embodiments of the present disclosure with reference to the accompanying drawings in which the same reference symbols generally refer to the same elements.

Throughout the drawings, the same or similar reference symbols refer to the same or similar elements.

DETAILED DESCRIPTION OF EMBODIMENTS

Figure 1:
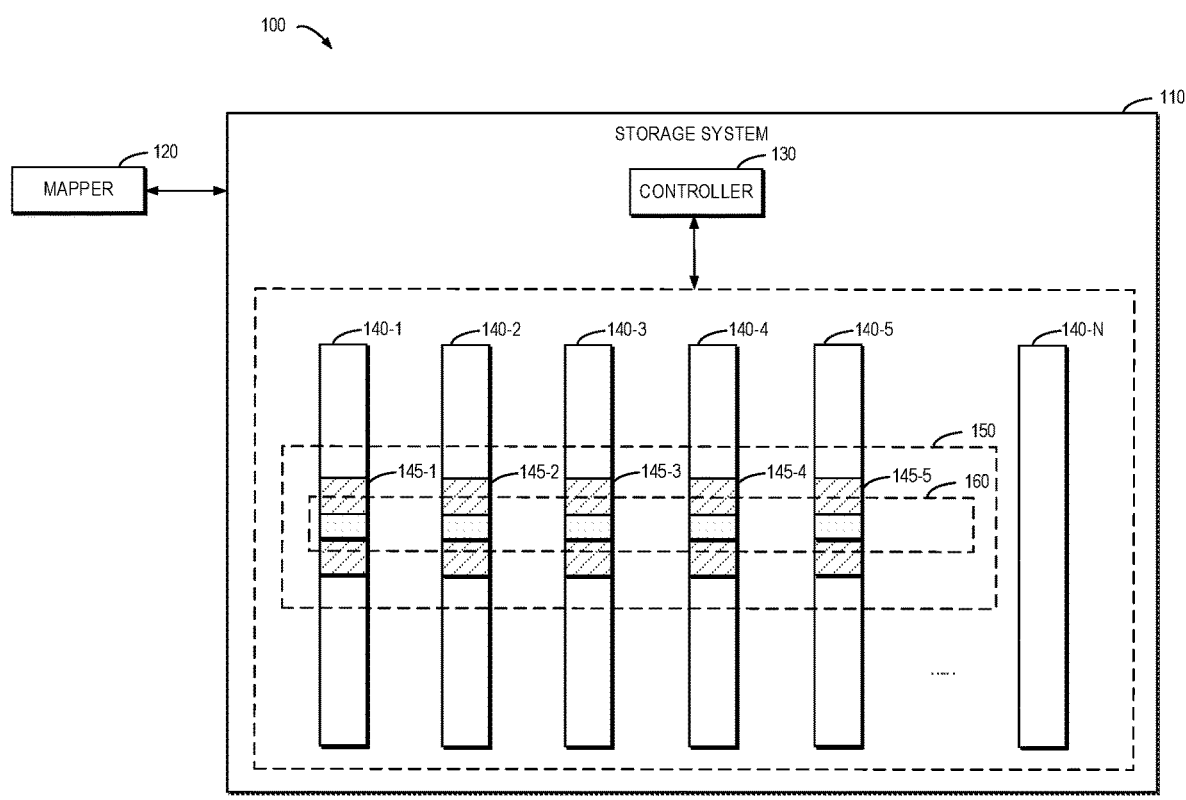
FIG. 1 illustrates a schematic diagram of an example of a storage management environment in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While the preferred embodiments of the present invention have been shown in the drawings, it should be understood that the present disclosure may be embodied in various forms and not limited by the embodiments set forth herein. Rather, the embodiments are provided so that this disclosure will be thorough and complete, and the scope of the disclosure may be fully conveyed to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

The storage system may include a plurality of disks. Each disk may be divided into a plurality of disk slices. A plurality of disk slices from different disks may constitute a storage array. For the reason of disk damage, load balance or the like, at least part of data on a disk may probably need to be transferred to other disks. Traditionally, a mapper, serving as a core component for managing the storage system, moves an entire storage array associated with the disk to a plurality of other disks and updates metadata associated with the disk. However, since the moving process is performed by the mapper, the design of the mapper is too complicated, impacting the performance of the storage system.

According to an example embodiment of the present disclosure, an improved solution for storage management is provided. In the solution, a controller in the storage system determines a source disk slice from a plurality of disk slices of a plurality of storage arrays providing redundant storage. Target data on the source disk slice is to be removed. In addition, the controller further determines a destination disk slice for storing the target data. The destination disk where the destination disk slice is located is different from the source disk where the source disk slice is located. Thereby, the controller moves the target data from the source disk slice to the destination disk slice. In this way, in the solution, the storage system, instead of the mapper, performs the moving process, thereby simplifying the design of the mapper and improving the efficiency of the storage system.

Hereinafter, embodiments of the present disclosure will be described in detail with reference to FIGS. 1-7. FIG. 1 illustrates a schematic diagram of an example of a storage management environment 100 in which some embodiments of the present disclosure can be implemented. The storage management environment 100 includes a storage system 110 and a mapper 120. The storage system 110 includes a controller 130 and a plurality of disks 140-1 to 140-N (where N is an integer greater than 0, the plurality of disks 140-1 to 140-N will be collectively referred to as "disk 140" hereinafter), such as Solid State Disks (SSDs).

All disks 140 in the storage system 110 may form a disk pool. The disk pool may be divided into a plurality of disk sets. Each disk set may include a plurality of disks. For example, each disk set may include up to 25 disks. Each disk set belongs to a fault domain, which means that, if a disk in a disk set fails, it will not impact reliability of other disk sets.

The disk 140 may be divided into a plurality of disk slices of a fixed size (e.g., 4 GB). For example, the disk 140-1 is divided into a plurality of disk slices, such as a disk slice 145-1. A predetermined number of disk slices from different disks 140 may form a storage array, for example, a storage array 150. The storage array may provide a function of a Redundant Array of Independent Disks (RAID). For example, as for RAID-5, 5 idle disk slices from different disks may form a storage array. As shown in FIG. 1, the storage disk 150 may include the disk slice 145-1 from the disk 140-1, a disk slice 145-2 from the disk 140-2, a disk slice 145-3 from the disk 140-3, a disk slice 145-4 from the disk slice 145-4, and a disk slice 145-5 from the disk 140-5. Since each disk set belongs to a fault domain, all disk slices in a storage array should always come from the same disk set.

Each storage array includes a plurality of storage stripes of a fixed size (e.g., 2 MB). As shown in FIG. 1, the storage array 150 includes a plurality of storage stripes, for example, a storage stripe 160. The storage stripe 160 may be distributed evenly in disk slices forming the storage array. For example, the 2 MB storage stripe 160 may be distributed evenly in the disk slices 145-1 to 145-5. Each of the disk slices 145-1 to 145-5 includes one fifth of the storage stripe 160, for example, 512 KB.

Furthermore, a plurality of storage arrays may form a storage layer accessible by users or other components. The storage system 110 may include storage layers for various purposes, such as a user data storage layer, a mapper storage layer, a log storage layer, and the like. Based on the data type stored in each storage layer, different redundant storage policies may be applied to each storage layer. However, each storage array in each storage layer has the same redundant storage policy, i.e., has the same number of disk slices and the same redundant storage type. In addition, the storage layer can be expanded on demand. In other words, a new storage array may be allocated dynamically and added to a storage layer.

The mapper 120 may treat each storage layer as a planar linear physical address space. On the other hand, the mapper 120 may present a single plane linear logical address space (for example, having a size of 8 EB) to a namespace. The namespace utilizes and manages the linear logical address space presented by the mapper 120. In addition, the namespace creates a storage volume and presents the storage volume to a user or host. The mapper further employs, for example, a B+ tree to maintain a mapping relationship between the logical address and the physical address in the granularity of memory page (for example, having a size of 4 KB).

The controller 130 is used to manage the storage system 110. Although the controller 130 is shown to be implemented within the storage system 110, the controller 130 may also be implemented outside the storage system 110. The position where the controller 130 is implemented is not limited. The controller 130 may be any device having a computing capability, including, but not limited to, a cloud computing device, large-scale computer, server, personal computer, desktop computer, laptop computer, tablet computer, and the like.

Specifically, the controller 130 may be used to move target data on a source disk to a destination disk. The objective of the movement is to achieve load balance in Input/Output (I/O) and capacity. For example, if a disk is damaged, target data on the damaged disk needs to be moved to other disks in a healthy state. Moreover, when a new disk is added into the storage system 110, target data on existing disks in the storage system 110 needs to be moved to the new disk, to balance the disk loads and the wearing levels of disks. Furthermore, if the loads on the disks in the storage system 110 are out of balance, target data on a hot disk (i.e., a disk having a heavy load) needs to be moved to a cold disk (i.e., a disk having a light load).

When it is determined that the target data on the source disk is to be moved, the controller 130 may determine a target storage array associated with the source disk from a plurality of storage arrays, and may determine, from the disk slices of the target storage array, a disk slice on the source disk as the source disk slice. In addition, the controller 130 may determine a destination disk slice for storing the target data. The destination disk where the destination disk slice is located is different from the source disk where the source disk slice is located.

After determining the target storage array, the source disk slice therein and the destination disk slice, the controller 130 may send, to the mapper 120, a request message for requesting the target data to be moved. Upon receiving the request message, the mapper 120 may determine whether the target data is to be moved or not. If the target data is to be moved, the mapper 120 may send a start message indicating a start of movement to the controller 130.

If the target data is to be moved, the mapper 120 may determine a target storage array from the request message, and thus determine a storage stripe being used in the target storage array. This is because that the mapper 120 knows utilization of the storage stripe in the storage array. Data stored in the part of the storage stripe located on the source disk slice is the target data.

The mapper 120 may send a data message associated with the target data to the controller 130. Upon receiving the data message, the controller 130 determines the target data based on the data message, and moves the target data from the source disk slice to the destination disk slice. The process is repeated until the mapper 130 determines that all the target data is moved (i.e., all storage stripes being used in the target storage array are moved). At this time, the mapper 120 may send an end message indicating an end of the movement to the controller 130. Upon receiving the end message, the controller 130 may replace the source disk slice with the destination disk slice.

It can be seen that, in the present solution, the mapper 120 does not care about details of the moving process. From the perspective of the mapper 120, the storage array is kept unchanged before and after the movement. In this way, the mapper 120 is simplified in design, and the efficiency of the storage system 110 is improved.

Figure 2:
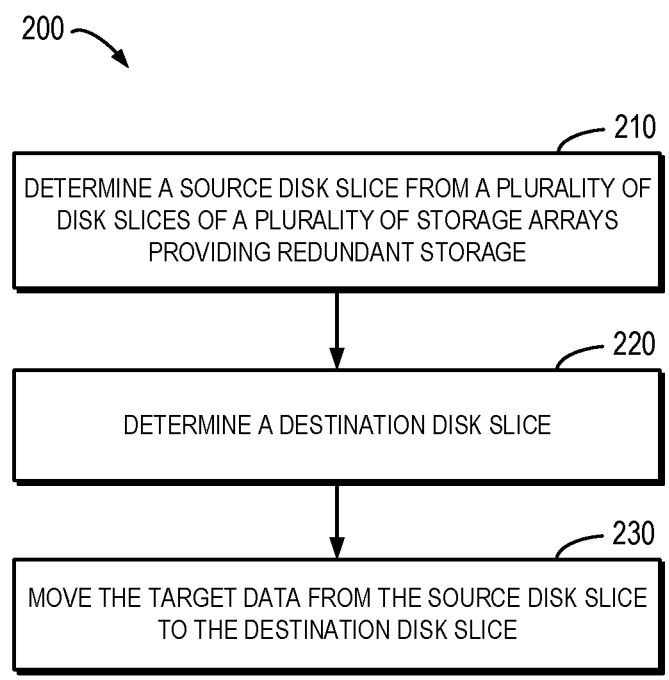
FIG. 2 illustrates a flowchart of a method for storage management according to some embodiments of the present disclosure.
Figure 3:
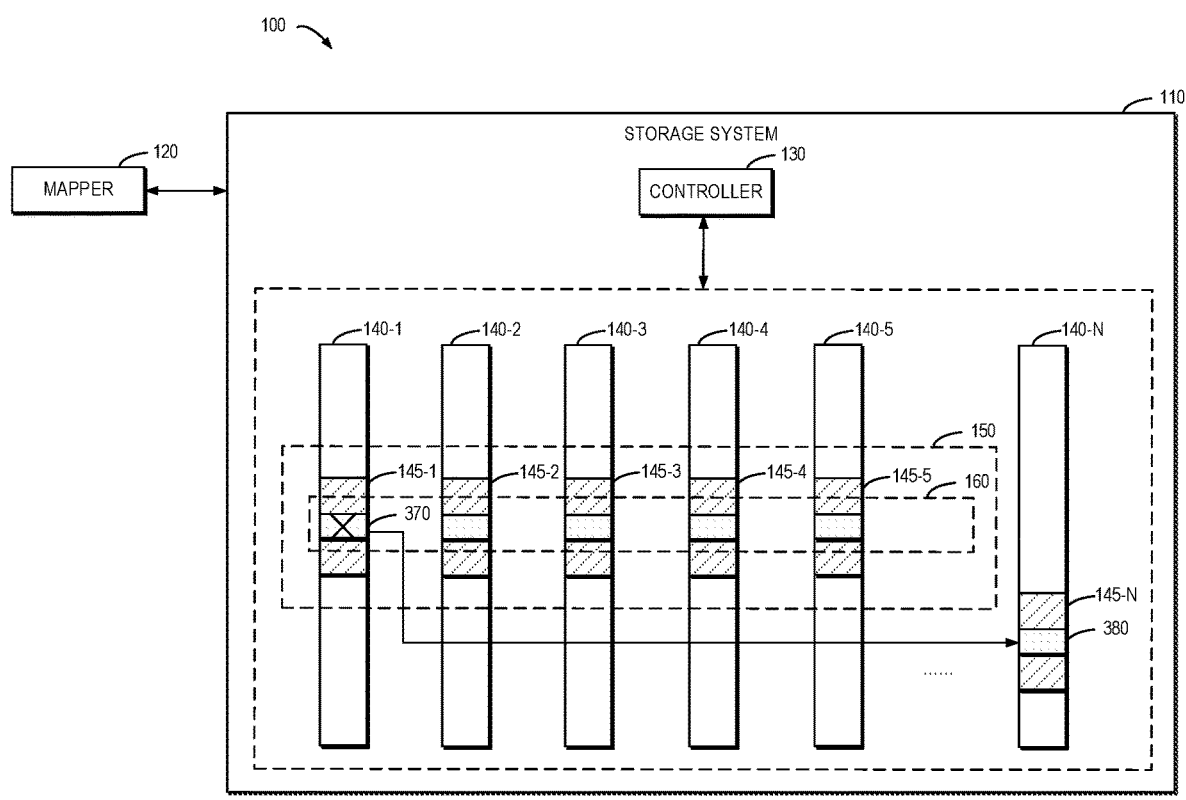
FIG. 3 illustrates a schematic diagram of an example of a moving process according to some embodiments of the present disclosure.

Hereinafter, reference will be made to FIGS. 2-6 to describe the actions of the controller 130 in detail. FIG. 2 illustrates a flowchart of a method 200 of storage management according to some embodiments of the present disclosure. For example, the method 200 may be performed by the controller 130 as shown in FIG. 1. It should be understood that the method 200 may further include additional steps not shown and/or omit steps shown, and the scope of the present disclosure is not limited in this regard. For ease of understanding, the method 200 will be described with reference to FIG. 3. FIG. 3 illustrates a schematic diagram 300 of an example of a moving process according to some embodiments of the present disclosure.

At 210, the controller 130 determines a source disk slice from a plurality of disk slices of a plurality of storage arrays providing redundant storage. The target data on the source disk slice is to be removed. As described above, for the purpose of load balance, the controller 130 needs to move at least part of data on the source disk to the destination disk. To this end, in some embodiments, the controller 130 may determine a source disk from disks corresponding to the plurality of storage arrays. At least the part of data on the source disk will be removed. Further, the controller 130 may determine a target storage array associated with the source disk from the plurality of storage arrays. The target storage array includes disk slices from the source disk. As a result, the controller 130 may determine, from the disk slices of the target storage array, a disk slice on the source disk as a source disk slice. At least the part of data to be removed include data in the determined disk slice.

As shown in FIG. 3, the controller 130 may determine the source disk 140-1 from the plurality of disks 140-1 to 140-N. Moreover, the controller 130 may determine, from the plurality of storage arrays, a target storage array 150 associated with the source disk 140-1, and determine, from the disk slices 145-1 to 145-5 of the target storage array 150, the disk slice 145-1 on the source disk 140-1 as the source disk slice.

At 220, the controller 130 determines a destination disk slice for storing target data to be removed from the source disk slice. The destination disk where the destination disk slice is located is different from the source disk where the source disk slice is located. As shown in FIG. 3, the controller 130 may determine an idle destination disk slice 145-N on the disk 140-N different from the disk 140-1.

Figure 4:
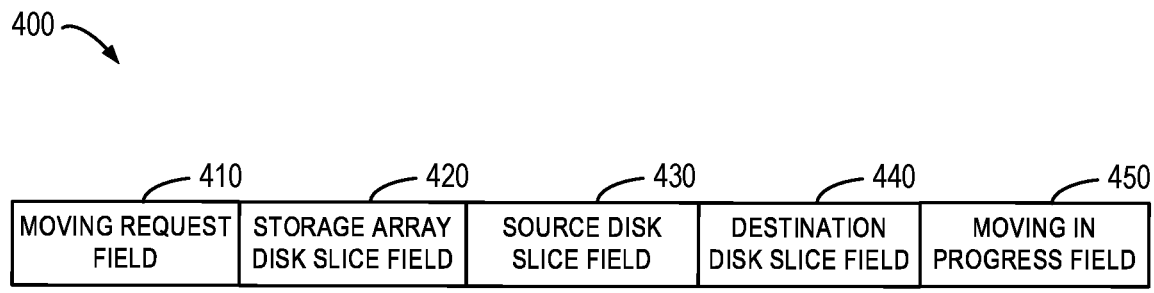
FIG. 4 illustrates a schematic diagram of an example of metadata of a storage array according to some embodiments of the present disclosure.

In order to support the movement, the present solution provides metadata for storage arrays. For ease of understanding, the metadata will be described with reference to FIG. 4. FIG. 4 illustrates a schematic diagram of an example of metadata 400 of a storage array according to some embodiments of the present disclosure. As shown in FIG. 4, the metadata 400 includes a moving request field 410, a storage array disk slice field 420, a source disk slice field 430, a destination disk slice field 440 and a moving in progress field 460. The controller 130 may access the metadata 400. In some embodiments, the metadata 400 may be stored in the storage system 110. In some embodiments, the moving in progress field 450 may be stored in the memory (not shown), and the other metadata, except the moving in progress field 450, may be stored in the storage system 110.

The moving request field 410 indicates whether the storage array needs to be moved from the source disk slice to the destination disk slice. When the moving request field 410 is set to be valid, it indicates that the movement is needed. The storage array disk slice field 420 indicates positions of a plurality of disk slices of the storage array on the respective disks. The source disk slice field 430 indicates a position of the source disk slice on the source disk. Since the positions of the plurality of disk slices on the respective disks, as indicated by the storage array disk slice field 420, also include the position of the source disk slice on the source disk, the source disk slice field 430 may be determined based on the storage array disk slice field 420 in some embodiments. The destination disk slice field 440 indicates the position of the destination disk slice on the destination disk. For example, the destination disk slice field 440 may include a destination disk identifier and a logical block address of the destination disk slice on the destination disk. The moving in progress field 450 indicates whether the movement is in progress or not. When the moving in progress field 450 is set to be valid, it indicates that the movement is in progress.

Different values of the fields correspond to different states of the storage array. For ease of understanding, the states of the storage array will be described with reference to FIG. 5.

Figure 5:
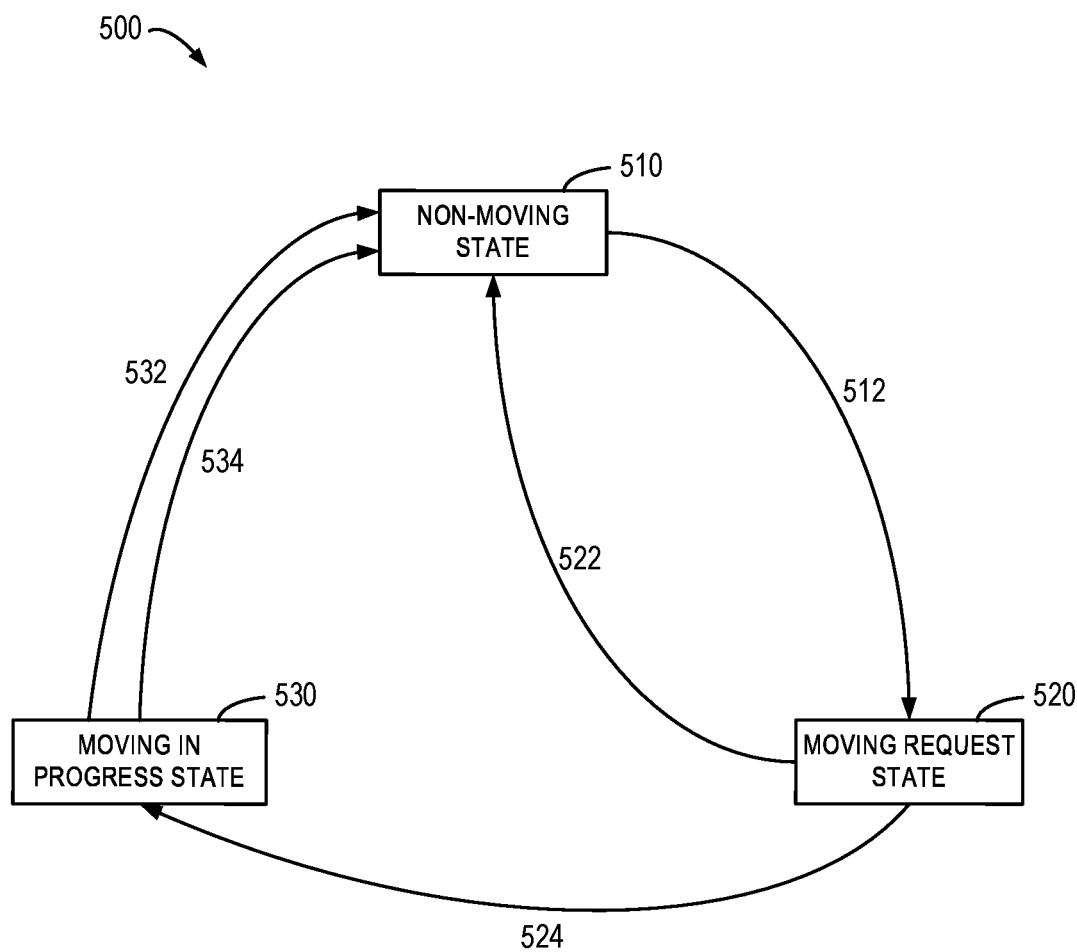
FIG. 5 illustrates a schematic diagram of an example of states of a storage array according to some embodiments of the present disclosure.

FIG. 5 illustrates a schematic diagram of an example of states 500 of the storage array according to some embodiments of the present disclosure. As shown in FIG. 5, the storage array has three states: a non-moving state 510, a moving request state 520 and a moving in progress state 530.

In the non-moving state 510, the moving request field 410, the source disk slice field 430, the destination disk slice field 440 and the moving in progress field 450 are all set to be invalid. In the moving request state 520, the moving request field 410, the source disk slice field 430 and the destination disk slice field 440 are set to be valid while the moving in progress field 460 is set to be invalid. In the moving in progress state 530, the moving request field 410, the source disk slice field 430, the destination disk slice field 440 and the moving in progress field 450 are all set to be valid.

The state of the storage array may be transitioned among the three states. More specifically, for a storage array in the non-moving state 510, when the controller 130 determines that the storage array needs to be moved from a source disk slice to a destination disk slice, the controller 130 may perform a moving request operation 512, to cause the storage array to enter the moving request state 520. In the moving request operation 512, the controller 130 sets the source disk slice field 430 to indicate the source disk slice, sets the destination disk slice field 440 to indicate the destination disk slice, and sets the moving request field 410 to be valid.

For the storage array in the moving request state 520, when the controller 130 determines to abandon the moving, the controller 130 may perform a moving abandon operation 522, to cause the storage array to return to the non-moving state 510. In the moving abandon operation 522, the controller 130 sets all of the moving request field 410, the source disk slice field 430 and the destination disk slice field 440 to be invalid.

In addition, for the storage array in the moving request state 520, when the mapper 120 determines to move the storage array, the mapper 120 may send, to the controller 130, a start message indicating a start of the moving. Upon receiving the start message, the controller 130 may perform a moving start operation 520, to cause the storage array to enter the moving in progress state 530. In the moving start operation 524, the controller 130 sets the moving in progress field 450 to be valid.

For the storage array in the moving in progress state 530, when the mapper 120 determines that all storage stripes of the target storage array have been moved, the mapper 120 may send, to the controller 130, an end message indicating an end of the moving. Upon receiving the end message, the controller 130 may perform a moving end operation 532, to cause the storage array to enter the non-moving state 510. In the moving end operation 532, the controller 130 utilizes the position of the destination disk slice on the destination disk to update the storage array disk slice field 420, and sets all of the moving in progress field 450, the moving request field 410, the source disk slice field 430 and the destination disk slice field 440 to be invalid.

Furthermore, for the storage array in the moving in progress state 530, when the controller 130 determines to abandon the moving, the controller 130 may perform a moving abandon operation 534, to cause the storage array to enter the non-moving state 510. In the moving abandon operation 534, the controller 130 sets the moving request field 410, the source disk slice field 430, the destination disk slice field 440 and the moving in progress field 450 all to be invalid. Thereby, the storage array enters into the non-moving state 510.

Returning now to FIG. 2, after determining the target storage array 150, the source disk slice 145-1 therein and the destination disk slice 145-N, the controller 130 may cause the target storage array 150 to enter the moving request state 520 from the non-moving state 510. In this case, for the target storage array 150, the controller 130 may set the moving request field 410 to be valid. In addition, the controller 130 determines the position of the source disk slice 145-1 on the source disk 140-1 from the storage array disk slice field 420, and sets the source disk slice field 430 to indicate the position of the source disk slice 145-1 on the source disk 140-1. The controller 130 further sets the destination disk slice field 440 to indicate the position of the destination disk slice 145-N on the destination disk 140-N.

At 230, the controller 130 moves the target data from the source disk slice 145-1 to the destination disk slice 145-N. As shown in FIG. 3, the target data 370 on the source disk slice 145-1 is removed, and is written onto the destination disk slice 145-N.

As described above, the moving is started in response to receiving, from the mapper 120, the start message indicating a start of the moving. The controller 130 may move the target data from the source disk slice 145-1 to the destination disk slice 145-N in accordance with a determination that the start message is received from the mapper 120. Moreover, the controller 130 may also set the moving in progress field 450 of the target storage array 150 to be valid. Since the moving request field 410 has been previously set to be valid, both the moving in progress field 450 and the moving request field 410 are valid at this time.

Figure 6:
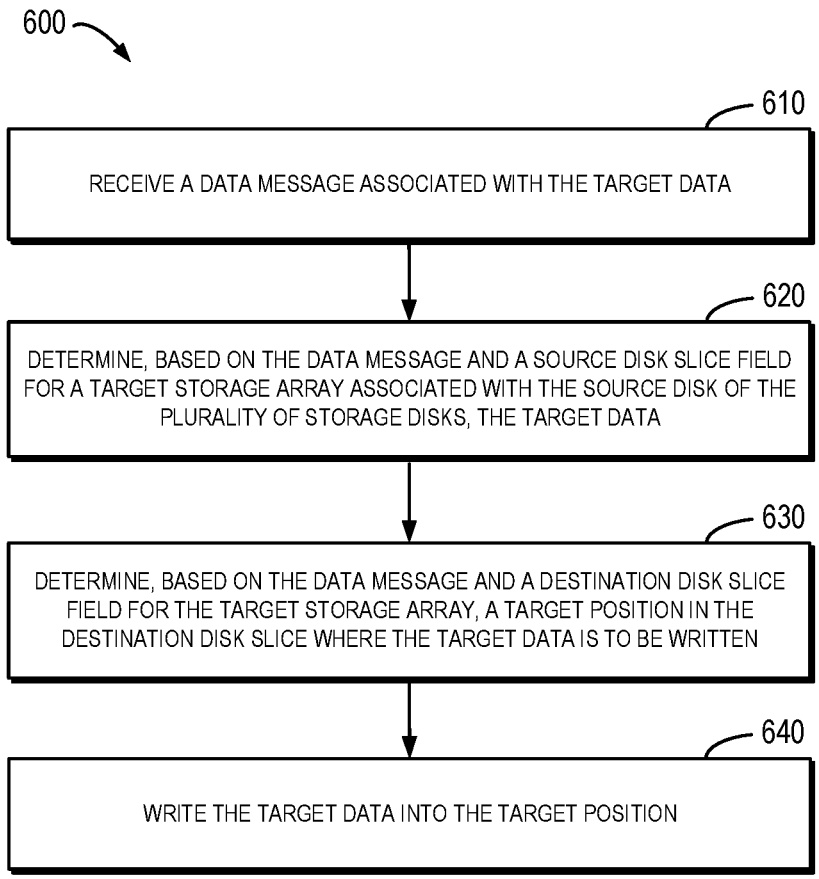
FIG. 6 illustrates a flowchart of a method of moving target data from a source disk slice to a destination disk slice according to some embodiments of the present disclosure.

FIG. 6 illustrates a flowchart of a method 600 of moving target data from a source disk to a destination disk slice according to some embodiments of the present disclosure.

At 610, the controller 130 may receive a data message associated with the target data. As described above, the data message is related to the storage stripe being used in the storage array. A part of the storage stripe located on the source disk slice is the target data. For example, the data message may include a logical block address of the target data and a size of the target data in blocks.

At 620, the controller 130 may determine the target data based on the data message and the source disk slice field 430 of the target storage array 150. In some embodiments, the controller 130 may determine, based on the data message, the position of the target data on the source disk slice 145-1 and the size of the target data. In addition, the controller 130 may determine, based on the source disk slice field 430, the position of the source disk slice 145-1 on the source disk 140-1. Therefore, the controller 130 may determine the target data based on the position of the source disk slice 145-1 on the source disk 140-1, the position of the target data on the source disk slice 145-1, and the size of the target data. For example, a start address of the target data on the source disk 140-1 may be obtained by adding a value of the position of the source disk slice 145-1 on the source disk 140-1 with a value of the position of the target data on the source disk slice 145-1. As such, data with a specified size starting from the start address may be determined as the target data.

At 630, the controller 130 determines, based on the data message and the destination disk slice field 440, a target position where the target data is to be written in the destination disk slice 145-N. In some embodiments, the controller 130 may determine, based on the destination disk slice field 440, the position of the destination disk slice 145-N on the destination disk 140-N. Consequently, the controller 130 can determine the target position based on the position of the destination disk slice 145-N on the destination disk 140-N and the position of the target data on the source disk slice 145-1. Note that the position of target data on the source disk slice 145-1 is still used here. This is because the target data needs to be written into the same position in the destination disk slice 145-N as the position in the source disk slice 145-1. For example, the start position of the target data on the destination disk 140-N can be obtained by adding the value of the position of the destination disk slice 145-N on the destination disk 140-N with the value of the position of the target data on the source disk slice 145-1.

At 640, the controller 130 may write the target data into the target position. In this way, since the controller 130 moves the target data from the source disk slice to the destination disk slice, the mapper 120 has a simplified design and the efficiency of the storage system 110 is improved.

Moreover, in order to further increase the efficiency of the storage system 110 and improve the user experience, the mapper 120 is allowed to access the storage system 110 during the moving process. In particular, the mapper 120 is allowed to access the storage array in the moving process. In this case, since the mapper 120 is allowed to access the storage array, the controller 130 needs to ensure data consistency of the storage array.

In the moving process, when the storage system 110 receives a write access, the controller 130 will check the moving in progress field 450. If the moving in progress field 450 is set to be valid and the write access involves the source disk slice 145-1, then in addition to the source disk slice 145-1, the controller 130 writes the data for the write access into the destination disk slice 145-N.

It can be seen that, providing the moving in progress field 450 can improve the access efficiency. Using the moving in progress field 450, the controller 130 may request to move the storage arrays as many as possible, but only the data for the write access regarding the storage arrays for which the moving in progress fields 450 are valid needs to be written into both the source disk slice 145-1 and the destination disk slice 145-N. For example, the controller 130 may request to move 100 storage arrays, but the mapper 120 decides to start moving only 4 storage arrays. In this case, only for the write access for the 4 storage arrays, the data needs to be written into both the source disk slice 145-1 and the destination disk slice 145-N.

Furthermore, upon starting, abandoning and ending the moving, the metadata of the storage array is changed. In order to prevent data damage, the controller 130 may suspend the write access to update the metadata of the storage array. To this end, the controller 130 may employ a write access blocking flag. When the write access blocking flag is set to be valid, the controller 130 may put all of incoming write access into a waiting queue. The controller 130 waits for completion of the storage array moving process and updates the metadata of the storage array. Then, the controller 130 may set the write access blocking flag to be invalid and allow execution of the write access in the waiting queue.

Read access is not affected by the improvement of the present solution. The destination disk slice 145-N does not participate in the read access, and the data is always read from the source disk slice 145-1. Thus, the description of this part is omitted herein.

Figure 7:
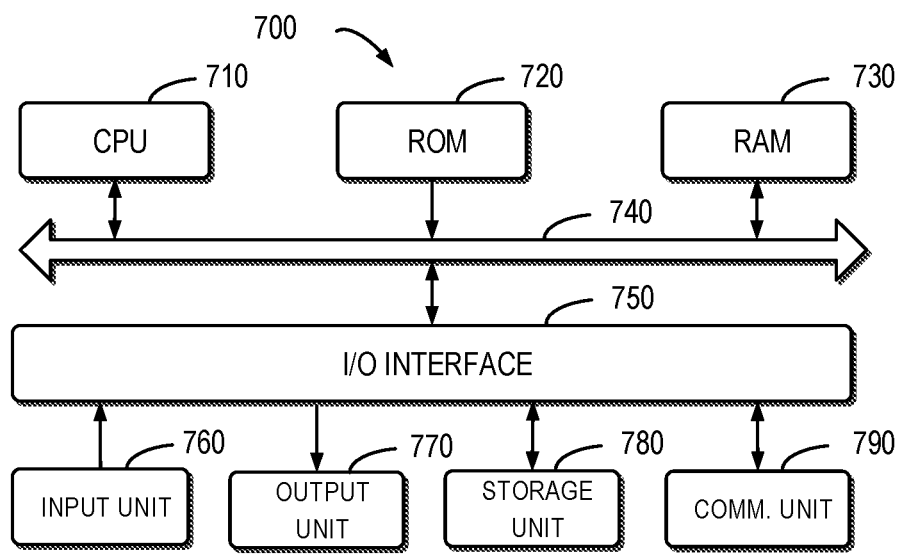
FIG. 7 illustrates a schematic block diagram of an example device that can be used to implement embodiments of the present disclosure.

FIG. 7 illustrates a block diagram of an example device 700 that may be used to implement embodiments of the present disclosure. For example, the controller 130 as shown in FIG. 1 may be implemented by the device 700. As shown, the device 700 includes a central processing unit (CPU) 710 which performs various appropriate acts and processing, based on computer program instructions stored in a read-only memory (ROM) 720 or computer program instructions loaded from a storage unit 780 to a random access memory (RAM) 730. The RAM 730 stores therein various programs and data required for operations of the device 700. The CPU 710, the ROM 720 and the RAM 730 are connected via a bus 740 with one another. An input/output (I/O) interface 750 is also connected to the bus 740.

The following components in the device 700 are connected to the I/O interface 750: an input unit 760 such as a keyboard, a mouse and the like; an output unit 770 including various kinds of displays and a loudspeaker, etc.; a storage unit 780 including a magnetic disk, an optical disk, and etc.; a communication unit 790 including a network card, a modem, and a wireless communication transceiver, etc. The communication unit 790 allows the device 700 to exchange information/data with other devices through a computer network such as the Internet and/or various kinds of telecommunications networks.

Various processes and processing described above, e.g., the methods 200 and 600, may be executed by the processing unit 710. For example, in some embodiments, the methods 200 and 600 may be implemented as a computer software program that is tangibly included in a machine-readable medium, e.g., the storage unit 780. In some embodiments, part or all of the computer programs may be loaded and/or mounted onto the device 700 via ROM 720 and/or communication unit 790. When the computer program is loaded to the RAM 730 and executed by the CPU 710, one or more acts of the methods 200 and 600 as described above may be performed.

The present disclosure may be a method, device, system, and/or computer program product. The computer program product may include a computer readable storage medium having computer readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card and/or network interface in each computing/processing device receive computer-readable program instructions from the network and forward the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing status information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage management in a storage system, the method comprising:

determining, by a controller configured to manage the storage system, a source disk slice from a plurality of disk slices of a plurality of storage arrays providing redundant storage, target data on the source disk slice needing to be removed;

determining, by the controller, a destination disk slice for storing the target data needing to be removed from the source disk slice, a destination disk where the destination disk slice is located being different from a source disk where the source disk slice is located, the plurality of storage arrays including a target storage array associated with the source disk;

in response to receiving, at the controller, a start message from a mapper configured to maintain a mapping relationship between a logical address space and a physical address space of the storage system:

moving, by the controller, the target data from the source disk slice to the destination disk slice; and setting, by the controller, a moving in progress field for the target storage array to be valid; and in response to receiving, at the storage system, a write access request involving the source disk slice:

determining, by the controller, that the moving in progress field for the target storage array is set to be valid; and in response to determining that the moving in progress field for the target storage array is set to be valid, writing, by the controller, data for the write access request into the destination disk slice in addition to moving, by the controller, the target data from the source disk slice to the destination disk slice.

2. The method of claim 1, wherein determining the source disk slice comprises:

determining the source disk from disks corresponding to the plurality of storage arrays, at least part of the target data on the source disk needing to be removed;

determining, from the plurality of storage arrays, the target storage array associated with the source disk; and determining, from disk slices of the target storage array, a disk slice on the source disk as the source disk slice, at least the part of the target data needing to be removed including data in the determined disk slice.

3. The method of claim 1, wherein moving the target data from the source disk slice to the destination disk slice comprises:

receiving a data message associated with the target data;

determining, based on the data message and a source disk slice field for the target storage array associated with the source disk of the plurality of storage disks, the target data;

determining, based on the data message and a destination disk slice field for the target storage array, a target position in the destination disk slice where the target data is to be written; and writing the target data into the target position.

4. The method of claim 3, wherein determining the target data comprises:

determining, based on the data message, a position of the target data on the source disk slice and a size of the target data;

determining, based on the source disk slice field, a position of the source disk slice on the source disk; and determining the target data based on the position of the source disk slice on the source disk, the position of the target data on the source disk slice and the size.

5. The method of claim 4, wherein determining the target position comprises:

determining, based on the destination disk slice field, a position of the destination disk slice on the destination disk; and determining, based on the position of the destination disk slice on the destination disk and the position of the target data on the source disk slice, the target position.

6. The method of claim 1, further comprising:

in accordance with a determination of the target storage array associated with the source disk of the plurality of storage arrays, setting a moving request field for the target storage array to be valid;

determining, from a storage array disk slice field for the target storage array, a position of the source disk slice on the source disk;

setting a source disk slice field for the target storage array to indicate the position of the source disk slice on the source disk; and setting a destination disk slice field for the target storage array to indicate a position of the destination disk slice on the destination disk.

7. The method of claim 1, further comprising:

in accordance with a determination that an end message indicating an end of the moving is received, updating a storage array disk slice field for the target storage array associated with the source disk of the plurality of storage arrays using a position of the destination disk slice on the destination disk; and setting the moving in progress field, a moving request field, a source disk slice field and a destination disk slice for the target storage array to be invalid.

8. An electronic device, comprising:

a controller configured to manage a storage system; and at least one memory coupled to the controller and storing instructions executed by the controller, the instructions, when executed by the controller, causing the device to perform acts comprising:

determining a source disk slice from a plurality of disk slices of a plurality of storage arrays providing redundant storage, target data on the source disk slice needing to be removed;

determining a destination disk slice for storing the target data needing to be removed from the source disk slice, a destination disk where the destination disk slice is located being different from a source disk where the source disk slice is located, the plurality of storage arrays including a target storage array associated with the source disk;

in response to receiving, at the controller, a start message from a mapper configured to maintain a mapping relationship between a logical address space and a physical address space of the storage system:

moving the target data from the source disk slice to the destination disk slice; and setting, by the controller, a moving in progress field for the target storage array to be valid; and in response to receiving, at the storage system, a write access request involving the source disk slice:

determining, by the controller, that the moving in progress field for the target storage array is set to be valid; and in response to determining that the moving in progress field for the target storage array is set to be valid, writing, by the controller, data for the write access request into the destination disk slice in addition to moving, by the controller, the target data from the source disk slice to the destination disk slice.

9. The electronic device of claim 8, wherein determining the source disk slice comprises:

determining the source disk from disks corresponding to the plurality of storage arrays, at least part of the target data on the source disk needing to be removed;

determining, from the plurality of storage arrays, the target storage array associated with the source disk; and determining, from disk slices of the target storage array, a disk slice on the source disk as the source disk slice, at least the part of the target data needing to be removed including data in the determined disk slice.

10. The electronic device of claim 8, wherein moving the target data from the source disk slice to the destination disk slice comprises:

receiving a data message associated with the target data;

determining, based on the data message and a source disk slice field for the target storage array associated with the source disk of the plurality of storage disks, the target data;

determining, based on the data message and a destination disk slice field for the target storage array, a target position in the destination disk slice where the target data is to be written; and writing the target data into the target position.

11. The electronic device of claim 10, wherein determining the target data comprises:

determining, based on the data message, a position of the target data on the source disk slice and a size of the target data;

determining, based on the source disk slice field, a position of the source disk slice on the source disk; and determining the target data based on the position of the source disk slice on the source disk, the position of the target data on the source disk slice and the size.

12. The electronic device of claim 11, wherein determining the target position comprises:

determining, based on the destination disk slice field, a position of the destination disk slice on the destination disk; and determining, based on the position of the destination disk slice on the destination disk and the position of the target data on the source disk slice, the target position.

13. The electronic device of claim 8, wherein the acts further comprise:

in accordance with a determination of the target storage array associated with the source disk of the plurality of storage arrays, setting a moving request field for the target storage array to be valid;

determining, from a storage array disk slice field for the target storage array, a position of the source disk slice on the source disk;

setting a source disk slice field for the target storage array to indicate the position of the source disk slice on the source disk; and setting a destination disk slice field for the target storage array to indicate a position of the destination disk slice on the destination disk.

14. The electronic device of claim 8, wherein the acts further comprise:

in accordance with a determination that an end message indicating an end of the moving is received, updating a storage array disk slice field for the target storage array associated with the source disk of the plurality of storage arrays using a position of the destination disk slice on the destination disk; and setting the moving in progress field, a moving request field, a source disk slice field and a destination disk slice for the target storage array to be invalid.

15. A computer program product having a non-transitory computer readable medium which stores a set of instructions to perform storage management; the set of instructions, when carried out by computerized circuitry, causing the computerized circuitry to perform a method for storage management in a storage system, the method comprising:

determining, by a controller configured to manage the storage system, a source disk slice from a plurality of disk slices of a plurality of storage arrays providing redundant storage, target data on the source disk slice needing to be removed;

determining, by the controller, a destination disk slice for storing the target data needing to be removed from the source disk slice, a destination disk where the destination disk slice is located being different from a source disk where the source disk slice is located, the plurality of storage arrays including a target storage array associated with the source disk;

in response to receiving, at the controller, a start message from a mapper configured to maintain a mapping relationship between a logical address space and a physical address space of the storage system:

moving, by the controller, the target data from the source disk slice to the destination disk slice; and setting, by the controller, a moving in progress field for the target storage array to be valid; and in response to receiving, at the storage system, a write access request involving the source disk slice:

determining, by the controller, that the moving in progress field for the target storage array is set to be valid; and in response to determining that the moving in progress field for the target storage array is set to be valid, writing, by the controller, data for the write access request into the destination disk slice in addition to moving, by the controller, the target data from the source disk slice to the destination disk slice.

* * * * *